Figure 1:
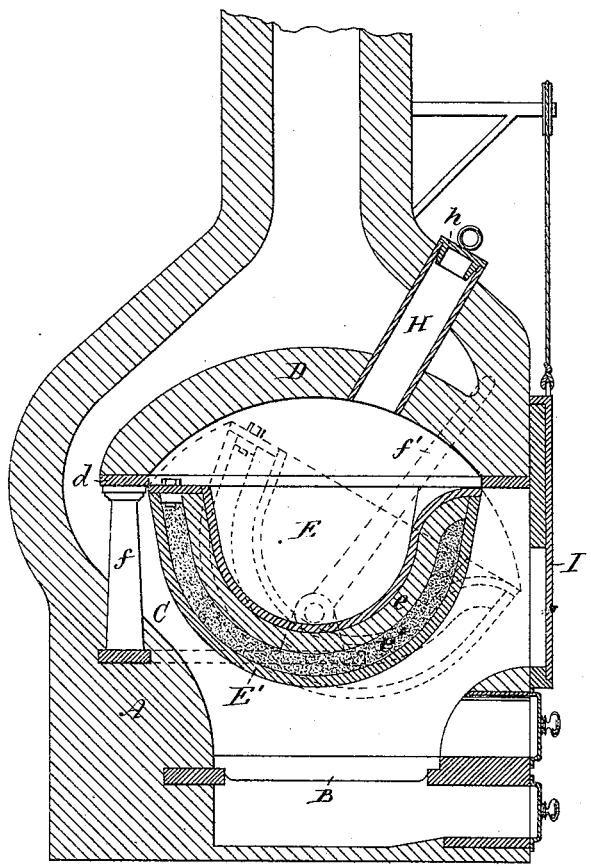

(No Model.) 4 Sheets—Sheet 1.

C. PAYEN.
PROCESS OF PRODUCING POROUS CRYSTALLIZED METAL PLATES.

No. 440,274. Patented Nov. 11, 1890.

WITNESSES:
Hermann Bormann
Thomas M. Smith

INVENTOR:
Clement Payen,
By J. Walter Douglass,
Atty.

(No Model.) 4 Sheets—Sheet 2.
C. PAYEN.
PROCESS OF PRODUCING POROUS CRYSTALLIZED METAL PLATES.
No. 440,274. Patented Nov. 11, 1890.
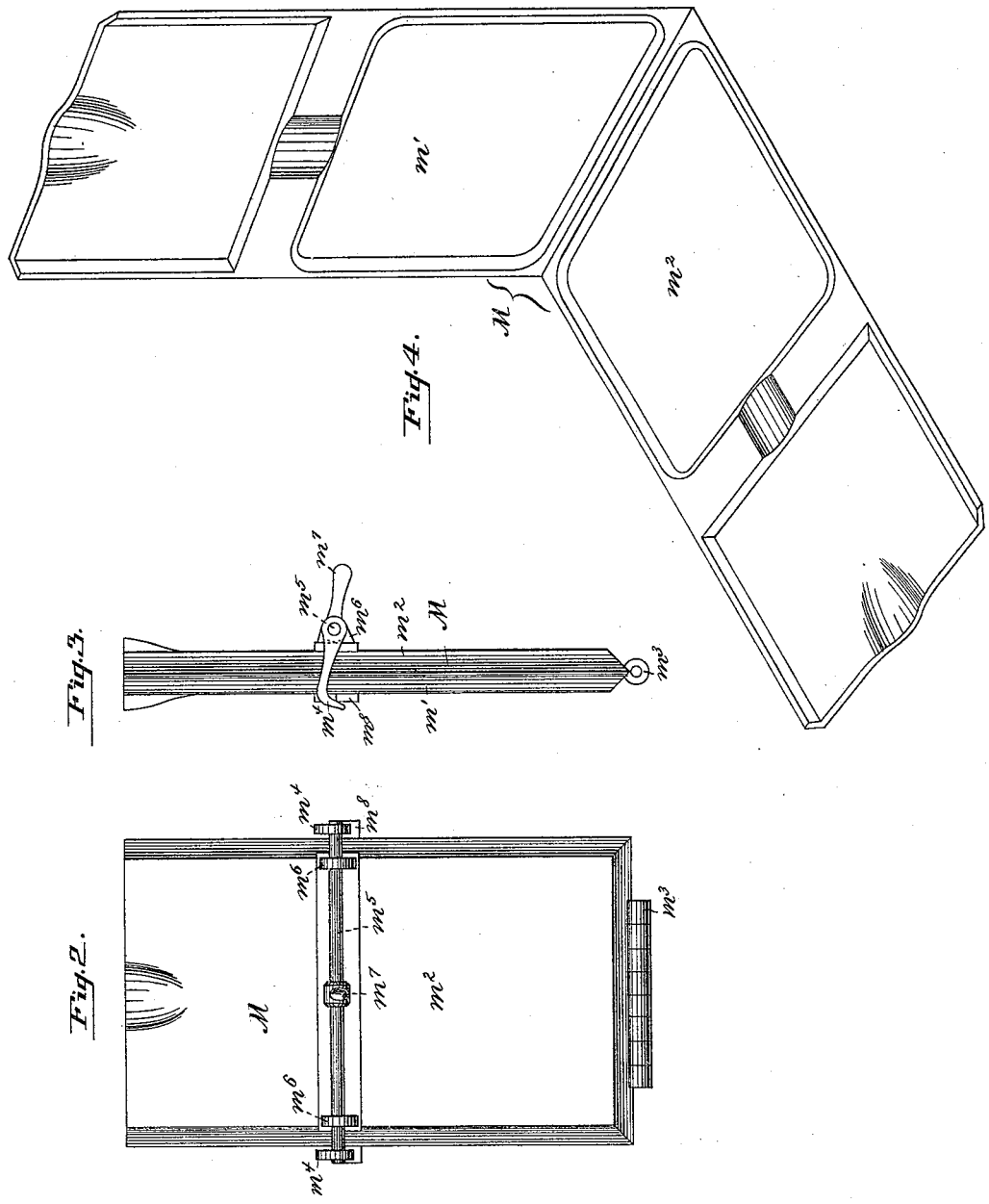
WITNESSES:
Hermann Bormann
Thomas M. Smith.
INVENTOR:
Clement Payen,
By J. Walter Douglass.
Atty.

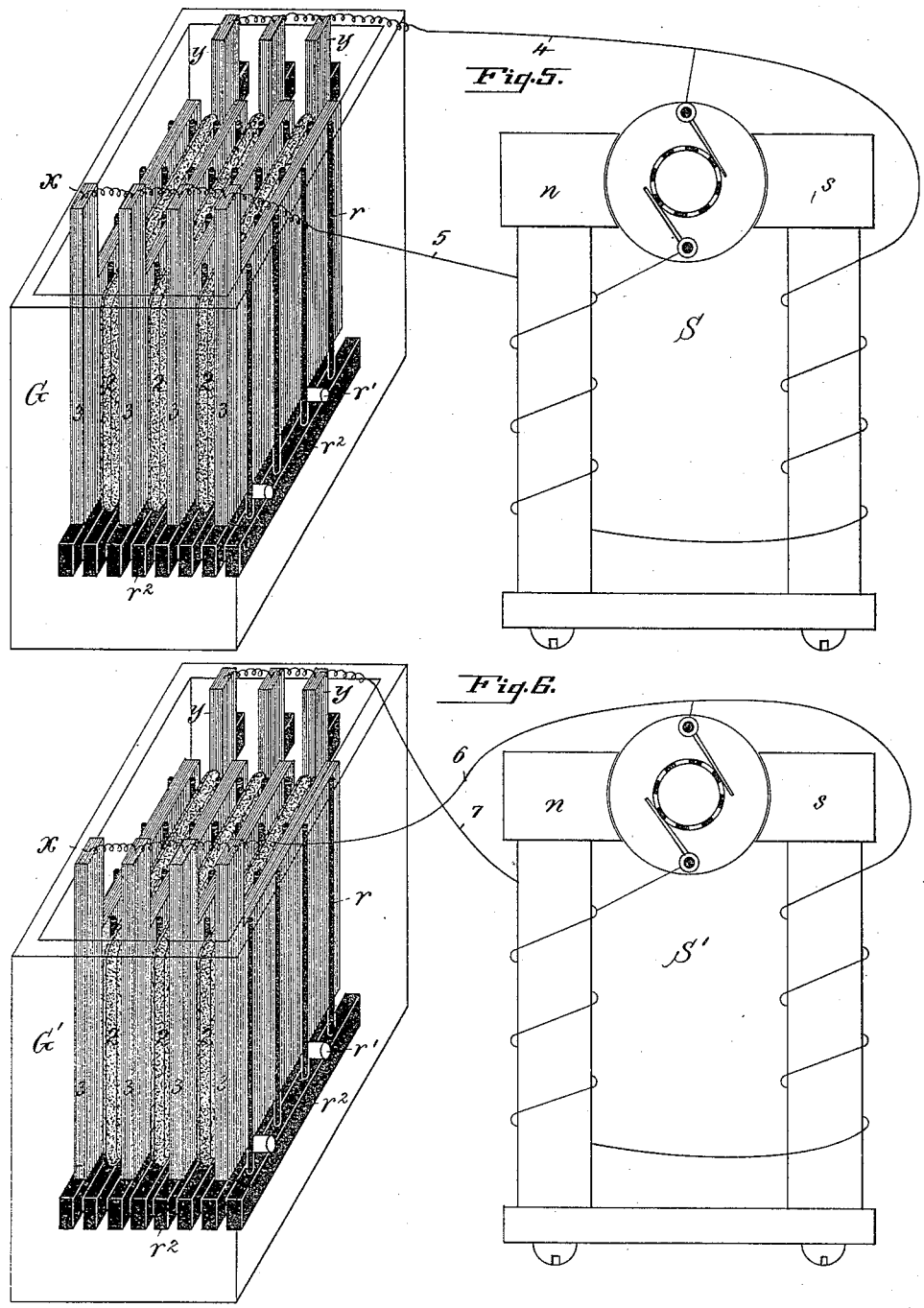

(No Model.) 4 Sheets—Sheet 4.
C. PAYEN.
PROCESS OF PRODUCING POROUS CRYSTALLIZED METAL PLATES.
No. 440,274. Patented Nov. 11, 1890.
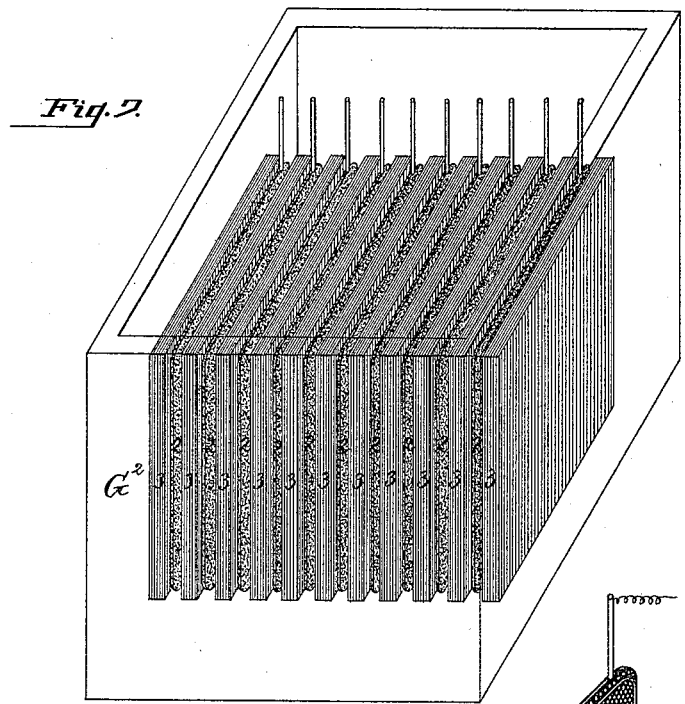
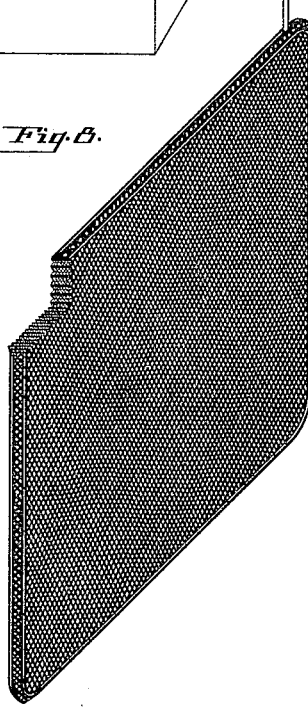
WITNESSES:
INVENTOR:

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF PRODUCING POROUS CRYSTALLIZED METAL PLATES.

SPECIFICATION forming part of Letters Patent No. 440,274, dated November 11, 1890.

Application filed June 18, 1888. Serial No. 277,482. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Process of Producing Porous Crystallized Metal Plates, of which the following is a specification.

The principal object of my invention is to provide a porous crystallized metal battery plate or element.

My invention consists, essentially, in fusing with the salt of a metal having an oxide of a metal and a non-oxidized compound of the same, or another metal mixed or combined therewith, then pouring the mass into a suitable mold to cause, by preferably a rapid cooling, the same to assume a crystallized form, and then reducing to a metallic state and eliminating therefrom extraneous matter or elements not forming a component part of the metal required.

In the accompanying drawings is illustrated an apparatus for the conduct of the method of producing a plate of my invention to form the element of a secondary or storage battery, and in which—

Figure 1 is a vertical central section of a furnace, showing a crucible pivotally supported therein. Fig. 2 is a top or plan view of a two-part mold. Fig. 3 is an end view thereof. Fig. 4 is a perspective view of the mold. Figs. 5 and 6 are respectively diagrammatic views showing a double electrolysis, being one of the ways in which the crystallized plates may be reduced to a metallic state, and for eliminating therefrom matter foreign to the metal required. Fig. 7 is a perspective view of a vase with a series of crystallized plates in contact with a series of metal, zinc, or other plates of the same dimension, the said plates mounted therein being immersed in a solution composed of water and, preferably, sal-ammonia for causing the crystallized plates to be reduced to a metallic state by chemical action; and Fig. 8 is a perspective view of a porous crystallized metal plate made in accordance with my invention, the said plate being partly broken away to show somewhat the form of the crystals therein, and with the cells between the respective crystals, and also showing a wire of platinum or other material inserted directly into the plate to form a conductor or terminal device.

Referring to the drawings, A is the furnace, constructed of brick or other suitable material, and B is a grate supported in the lower part of the furnace.

C is a draft-flue, and D is an arch in the upper part of the furnace supported by a ring *d*, held in position by means of columns *f*, arranged and supported in the brick-work of the furnace.

E is a crucible open at the top, and around which is formed a layer of amianthus, asbestus, or other material, forming a capsule *e*. Between the capsule *e* and the metal-pot E' is formed a layer of sand *e'*. The metal-pot E' is pivotally supported in a central position within the furnace, and is operated from the outside by a lever *f'*, attached to one of the journals of the metal-pot E', in order that the crucible may be readily tilted for discharging its contents for further treatment.

H is an inclined hopper provided with a removable stopper *h* for charging the material into the crucible.

I is a door, which may be raised and lowered to allow of the tilting of the crucible E by means of the lever *f'* to permit of the discharge of the mass into a mold to assume a crystallized form.

The method of producing a plate or element of my invention may be conducted in the following manner: To a charge consisting of a salt of lead is mixed at the required time and in any preferred manner from two to ten per cent., by weight, more or less, of litharge and fluoride of lead. The mass or compound is then after fusion in the crucible of the furnace, as hereinbefore described, poured into a mold to cool or become perfectly cold, when the cast structure is reduced chemically or electrolytically, or by both methods of treatment, to a metallic state for use. Again, to a charge composed of a salt of lead is added minium (red lead) and fluoride and arsenide of lead in the proportion of two to ten per cent., by weight, more or less. Again, to a charge composed of a salt of lead may be added either hydrate, nitrate, carbonate, borate, or silicate of lead or of another metal or of other metals or two or more of said metallic materials in about the proportions, by weight, hereinbefore mentioned. Again, to a charge composed of a salt of a metal is added in variable proportions, by weight, and in any preferred manner litharge or minium and either sulphide, selenide, telluride, phosphide, chloride, bromide, or iodide of lead or zinc or of two or more of said metallic materials in about the proportions, by weight, above mentioned and the mass or compound after fusion allowed to cool in a mold, and then reduced either chemically or electrolytically, or by both methods of treatment, to a metallic state for use. Again, to a charge composed of nitrate or sulphate of lead both oxygen yielding or containing salts is added an oxide of a metal—as litharge or minium—and a non-oxidized salt or compound of the same metal—as chloride of lead—or of a different metal—as chloride of sodium—in proportions ranging from two to ten per cent., by weight, more or less, and the mass or compound treated substantially in the manner hereinbefore described to permit the same to arrive at a metallic state or condition for use.

The selection of material for the mold M is important, and the interior should be perfectly smooth. Molds made of malleable or cast iron become deteriorated in a short time, owing to the tendency of salts to adhere to the sides thereof. The same objection exists respecting the use of porcelain molds; but in the use of those made of lead, with the exercise of care in handling, good results may be obtained. The material to which preference is given for the formation of the mold is either brass or bronze. The mold being composed of two symmetrical parts or sections $m'$ and $m^2$, chamfered, as shown in Fig. 4, and the two parts hinged together at $m^3$, are firmly clamped together by means of catches $m^4$, mounted on the extremities of a shaft $m^5$, which is held in bearings $m^6$, formed with one of the sections and operated by a lever $m^7$, as shown, for instance, in Figs. 2 and 3, these catches $m^4$ being caused to engage with a strip $m^8$ on the opposite part of the mold M by means of the lever $m^7$.

The mold M may be constructed in two parts of either equal or unequal thicknesses of metal.

A plate produced in the manner hereinbefore described having become cool or perfectly cold in the mold, it is then unclamped and the plate removed therefrom for further treatment—that is, a series of such plates is placed in a vase G in a solution of water and sulphuric acid. The crystallized plates 2, immersed in the solution in the vase G, are alternated with plates of equal dimensions composed of lead, artificial charcoal, or other material 3, each having terminal $x$. All the crystallized plates 2 are connected through their terminals $y$ with a wire 4, while the lead, charcoal, or other plates 3 are connected through their terminals $x$ with a wire 5. The two systems of plates are insulated from each other by insulating-rods $r$ and from the vase G by insulators $r'$, mounted on horizontal rods $r^2$ in the bottom of the vase G, as shown in Fig. 5, the system of crystallized plates being connected with the negative electrode $s$ of the dynamo S, while the system of lead or charcoal plates is connected with the positive electrode $n$ of the dynamo S, and the electrolytic action permitted to take place. The crystallized plates thus treated are then removed and immersed in another vase $G'$, containing water and sulphuric acid in about the same proportions as hereinbefore mentioned. In this second receptacle $G'$ the crystallized plates are again alternated with others of ordinary lead or artificial charcoal, as in the previous instance, and the two systems of plates insulated, respectively, from each other and the vase $G'$ are again connected by two wires 6 and 7 with the positive and negative electrodes $n$ and $s$ of a dynamo $S'$, as in the first instance mentioned, with this exception, that the negative electrode $s$ is connected with the system of lead or charcoal plates through the terminals $x$, while the positive electrode $n$ is connected with the system of crystallized plates through the terminals $y$, as shown in Fig. 6. By the second electrolytic action which takes place the plates are thoroughly reduced to a metallic state.

In Fig. 7 I have shown another mode of reducing the crystallized plates by chemical action to a metallic state, which may be carried out in the following manner: In a vase $G^2$ containing a solution of a chloride or salt and water, preferably dilute sal-ammoniac, in the proportion of five to ten per cent., more or less, a series of the crystallized plates is arranged alternately in contact with a series of metallic, zinc, or other plates of equal dimensions. A series of the crystallized plates 2 is arranged in contact with the metallic zinc plates 3 of equal dimension in the solution composed of sal-ammoniac and water in a vase $G^2$ for from twelve to fifteen hours, more or less, which causes, by the chemical action taking place upon the crystallized plates, the gases contained in the crystallized plates to be eliminated and also the foreign elements contained therein to combine with the solution of the vase $G^2$, thereby leaving the crystallized plates in a strong porous metallic state. These porous crystallized metal plates treated in either of the above ways by electrolytic or chemical action, or both, may then be removed from the vase $G^2$, thoroughly washed, and then dried by a gentle heat, whereby they will be brought to a chemically-pure porous crystallized metallic state in a form, as illustrated in Fig. 8, for use as the plates or elements of a secondary or storage battery.

Having thus described the nature and ob- jects of my invention, what I claim as new, and desire to secure by Letters Patent, is—

1. The method of producing a porous crystallized metal plate, which consists in fusing with the salt of a metal an oxide of a metal and a non-oxidized salt or compound of the same or another metal, then casting the mass in a mold and allowing it to cool therein, and then reducing the structure to a metallic state, substantially as described.

2. The method of producing a porous crystallized metal plate, which consists in subjecting with the salt of a metal an oxide of a metal and a non-oxidizable salt or compound of the same or another metal or metals to fusion, then pouring the mass into a mold and allowing it to cool and crystallize therein, and then reducing the structure by electrolytic action to a metallic state, substantially as described.

In witness whereof I have hereunto set my signature in the presence of two subscribing witnesses.

CLÉMENT PAYEN.

Witnesses:
FRANK C. LEWIN,
THOMAS M. SMITH.